Aug. 21, 1934.　　　　E. LEAVERTON　　　　1,971,224
OILER
Filed Jan. 11, 1934
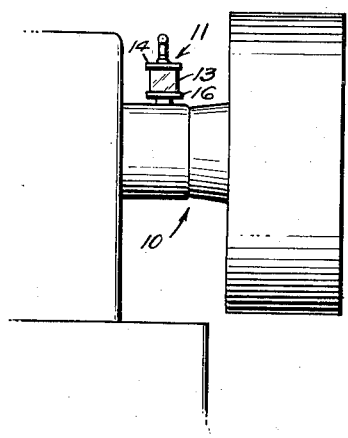
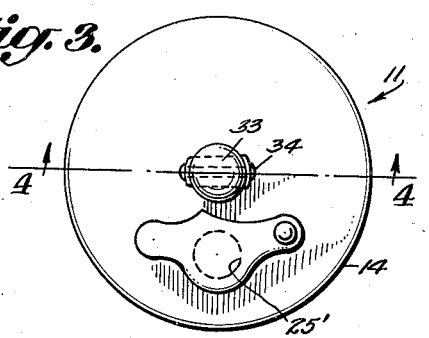
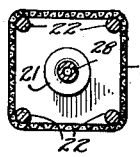
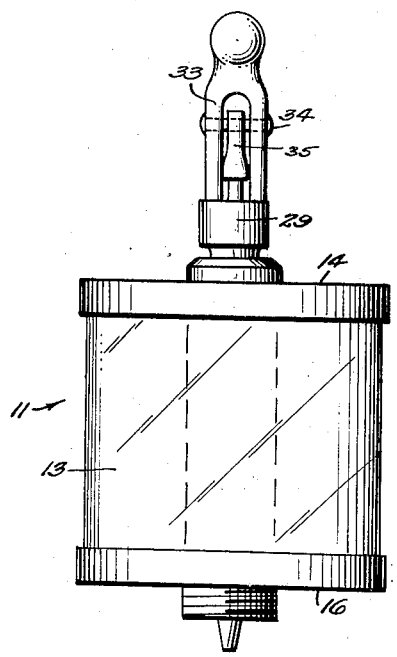
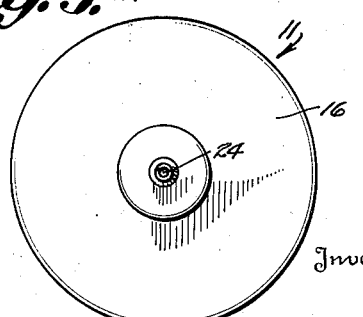
Inventor
Earl Leaverton
By Miller & Miller
Attorneys Patented Aug. 21, 1934

1,971,224

UNITED STATES PATENT OFFICE 1,971,224

OILER

Earl Leaverton, Cherokee, Iowa

Application January 11, 1934, Serial No. 706,267

5 Claims. (Cl. 184—65)

This invention relates to an oiler and has for an object to provide an improved lubricating means for use on all types of machinery.

A further object of this invention is to provide an oiler having a screened sediment trap and a hollow stem and valve allowing the atmospheric pressure to reach the drain conduit whereby all the oil therein will flow to the part of the machinery being for oil.

A further object of this invention is to provide an improved oiler of the general nature shown in the patent to Dean, #835,815, Nov. 13, 1906 and Ritter, #639,293, Dec. 19, 1899, having the additional features and objects hereinafter set forth.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a side elevation view of the invention, Figure 2 is an enlarged front elevation view of the invention, Figure 3 is a top plan view of the same, Figure 4 is a sectional view taken on the line 4—4 of Figure 3, Figure 5 is a bottom view of the oiler, Figure 6 is a sectional view taken on the line 6—6 of Figure 4.

There is shown at 10 a conventional representation of a piece of machinery to which the oiler 11 constituting this invention has been attached. This oiler 11 includes an oil reservoir 12 consisting of a heavy glass cylinder 13, a top cap 14, a gasket 15, a base 16, and a gasket 17. A means for holding the top cap 14 to the base 16 includes a female nut 18 threaded about an apertured depending threaded extension 19 on the top cap 14 and another female nut 20 threaded about an apertured extension 21 rising from the base 16.

A plurality of connecting rods 22 secure the female nuts 18 and 20 together, and a screening 23 is wrapped about the connecting rods 22 and the nuts 18 and 20. The extension 21 has an oil drain conduit 24 therethrough leading from the valve seat 25 formed in the top thereof. The oil is fed into the reservoir 12 by means of a covered opening 25' in the top cap 14 thereof and a sediment trap 26 is formed in the bottom of the oil reservoir 12 below the level of the top of extension 21 and valve seat 25, the oil from the reservoir 12 having to pass through the screening 23 on its way to the valve seat 25 and drain conduit 24.

A valve 27 serves to close off the valve seat 25 opening to the conduit 24 and prevents the oil from draining therethrough. This valve 27 is provided with a hollow stem 28, the hollow stem extending through the male nut 29 threaded through the extension 19 in the top cap 14. An aperture 30 in the top of the valve stem 28 connects the hollow in the valve stem to the atmosphere and connects through the valve 27 to the drain conduit 24. A shoulder 31 formed on the valve stem 28 provides a seat for the compression spring 32 whose other end rests against the bottom of the male nut 29. The spring 32 ordinarily holds the valve 27 against the seat 25 preventing oil from draining therethrough unless the spring is compressed and the stem drawn upwardly by means of the lever 33 which is hinged as at 34 to a nipple 35 secured to the top of the hollow valve stem 28.

When the lever 33 is folded over to the full line position shown in Figure 4 the compression spring 32 forces the valve 27 against its seat 25 cutting off the flow of oil therethrough and allowing atmospheric pressure through the opening 30 and the hollow in the stem to cause the drain conduit 24 to empty itself. When the lever 33 is raised to the vertical position shown in dot dash outline at 33' the spring 32 will be compressed as the valve 25 is withdrawn from its seat, allowing the oil from the reservoir 12 to pass through the screen 23 above the sediment trap 26 and through the drain 24. Due to the bottom of the lever 33 being straight the valve 25 may be held withdrawn from its seat as long as desired.

The novel features and the operation of this device will be apparent from the foregoing description. While the device has been shown and the structure described in detail, it is obvious that this is not to be considered limited to the exact form disclosed and that changes may be made therein within the scope of what is claimed, without departing from the spirit of the invention.

Having thus set forth and disclosed the nature of this invention, what is claimed is:

1. An oiler comprising an oil reservoir, a heavy glass cylinder, a top cap, a bottom cap, and a means securing said top cap to said bottom cap and providing a sediment trap in the bottom of said oil reservoir, said means including a pair of female nuts and a plurality of connecting rods securing said nuts together in spaced apart relation.

2. An oiler comprising an oil reservoir, a heavy glass cylinder, a top cap, a bottom cap, and a means securing said top cap to said bottom cap and providing a sediment trap in the bottom of said oil reservoir, said means comprising a pair of female nuts, a plurality of connecting rods securing said nuts together in spaced apart relation, and a screen member wrapped about said nuts and connecting rods.

3. An oiler comprising an oil reservoir, a heavy glass cylinder, a top cap, a base, a means securing said top cap to said base and providing a sediment trap in the bottom of said oil reservoir, said means comprising a pair of female nuts, a plurality of connecting rods securing said nuts together in spaced apart relation, and a screen member wrapped about said nuts and connecting rods, said top cap having a threaded extension cooperating with one of said nuts, said base having a threaded extension cooperating with the other of said nuts, said extension on said base extending a substantial distance thereabove.

4. An oiler comprising an oil reservoir, a heavy glass cylinder, a top cap, a base, a means securing said top cap to said base and providing a sediment trap in the bottom of said oil reservoir, said means comprising a pair of female nuts, a plurality of connecting rods securing said nuts together in spaced apart relation, a screen member wrapped about said nuts and connecting rods, said top cap having a threaded extension cooperating with one of said nuts, said base having a threaded extension cooperating with the other of said nuts, said extension on said base extending a substantial distance thereabove, an aperture through each of said extensions, a valve seat leading to said aperture in said base extension, a valve adapted to seat on said valve seat, a hollow valve stem extending through said aperture in said other extension, and means secured in said other extension yieldingly pressing said hollow valve stem and valve against said seat.

5. An oiler comprising an oil reservoir, a heavy glass cylinder, a top cap, a base, a means securing said top cap to said base and providing a sediment trap in the bottom of said oil reservoir, said means comprising a pair of female nuts, a plurality of connecting rods securing said nuts together in spaced apart relation, a screen member wrapped about said nuts and connecting rods, said top cap having a threaded extension cooperating with one of said nuts, said base having a threaded extension cooperating with the other of said nuts, said extension on said base extending a substantial distance thereabove, an aperture through each of said extensions, a valve seat leading to said aperture in said base extension, a valve adapted to seat said valve seat, a hollow valve stem extending through said aperture in said other extension, and means secured in said other extension yieldingly pressing said hollow valve stem and valve against said seat, said yielding securing means comprising a male nut threaded through said aperture in said top cap, a shoulder formed on said valve stem, and a spring interposed between said shoulder and said male nut, said hollow valve stem extending through an aperture in said male nut, an opening in said hollow valve stem to the atmosphere exteriorly of said oil reservoir, and lever means connected to said valve stem for manually withdrawing said valve from its valve seat against the action of said spring permitting oil from said reservoir to drain through said screen above said sediment trap through said valve seat and when said valve is released against said valve seat permitting atmospheric pressure through said hollow valve stem to allow the oil in said aperture in said base to drain entirely therefrom.

EARL LEAVERTON.